June 15, 1926.
R. MALCOM
GOGGLES
Filed Nov. 5, 1925
1,589,190
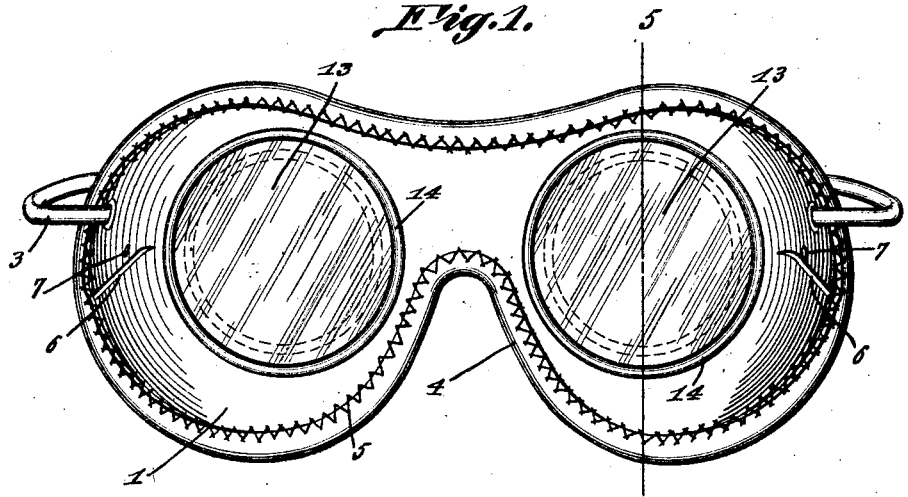
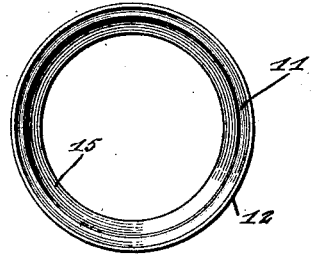
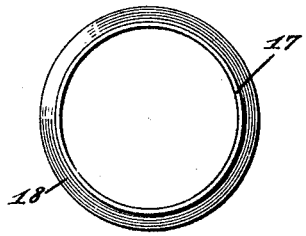
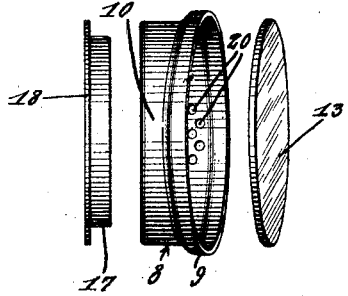
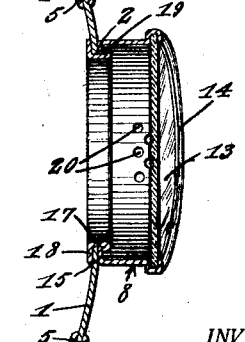
INVENTOR.
Robert Malcom,
BY
Geo. P. Kimmel. ATTORNEY.

Patented June 15, 1926.

1,589,190

UNITED STATES PATENT OFFICE.

ROBERT MALCOM, OF CHICAGO, ILLINOIS.

GOGGLES.

Application filed November 5, 1925. Serial No. 67,084.

This invention relates to goggles and has for its object to provide an article of such class with means, in a manner as hereinafter set forth, for fixedly securing the eye cups to the body portion or mask of the goggles.

A further object of the invention is to provide, in a manner as hereinafter set forth, an article of the class referred to, including a pair of eye cup fixing members and which are capable of being riveted in position relative to the eye cups and body portion or mask of the article, thereby fixedly securing the eye cups in position and overcoming the separation of the eye cups from the body portion or mask of the article, which objection is present in the forms of goggles now generally manufactured, as in the majority of cases the eye cups are merely slipped through the body portion or mask and held in place by friction only.

Further objects of the invention are to provide, in a manner as hereinafter set forth, eye cup goggles which are simple in construction and arrangement, strong, durable, thoroughly efficient in use, and comparatively inexpensive to manufacture.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a front elevation of a pair of goggles in accordance with this invention.

Figure 2 is a rear elevation of the eye cup.

Figure 3 is a front elevation of the eye cup fixing member.

Figure 4 is a disassembled view of the eye cup, lens or glass and fixing member for the eye cup.

Figure 5 is a section on line 5—5, Figure 1.

Referring to the drawings in detail, the body portion or mask 1 of the goggles is formed of any suitable material and can be flat or pressed into any suitable shape, or formed in any suitable manner, and is provided with a pair of spaced openings 2. A flexible attaching means for securing the body portion or mask 1 in position on the wearer is indicated at 3 and preferably is formed from a length of elastic cord, webbing or braid. The body portion or mask 1 may be provided throughout its outer edge with a binder 4 secured in position by a row of stitching 5. As illustrated, the body portion or mask 1 is of the shaped type and slitted, as at 6, to provide for the overlapping of the body portion or mask 1 to maintain the latter in the desired shape. The overlapping parts of the body portion or mask 1 are secured together by suitable holdfast devices 7. The foregoing type of mask or body portion 1 is of known construction and is illustrated to show the manner in which the eye cups are fixedly secured in position. It is to be understood, however, that the body portion or mask 1 can be constructed in any manner desired.

Connected to the front of the body portion or mask 1 and surrounding each opening 2, is a forwardly extending eye cup referred to generally by the reference character 8. The eye cup 8 is formed from any suitable material and the front thereof inclines inwardly in a direction towards the vertical median of the body portion or mask 1, as indicated at 9. The rear of the cup 8 is straight and owing to the inclined front of the cup 8 the body portion of the latter, which is indicated at 10, gradually increases in width from the transverse median of the inner side of the cup to the transverse median of the outer side of the cup. The front of the cup is formed with a laterally extending annular offset portion shaped to provide a seat 11 terminating in a forwardly extending annular flange 12. The seat 11 is provided for the glass or lens 13, and the flange 12 is bent to overlap the outer face of the glass or lens 13 at the perimeter thereof, as indicated at 14 for the purpose of securely connecting the glass or lens to the eye cup at the front thereof. The glass or lens 13 is of a diameter slightly greater than the diameter of that part of the body portion 10 of the cup arranged rearwardly of the offset portion at the front of the cup.

The body portion 10, at the rear thereof, is formed with an inwardly extending annular flange 15, which has its edge flush with the wall of the opening 2. The flange 15 is positioned against the outer face of the body portion or mask 1 and the manner in which the eye cup 8 is positioned against the body portion or mask 1 is clearly shown in Figure 5.

The cup 10 is fixedly secured to the body portion or mask 1 through the medium of a securing member which is in the form of an eyelet and riveted in position, and said member consists of a collar 17 of an outer diameter to snugly engage the wall of the opening 2 and of a width to extend a substantial distance within the cup 8. The collar 17 has its rear provided with a laterally extending annular flange 18 which bears against the inner face of the body portion or mask 1 in proximity to the opening 2 and as shown in Figure 5. The collar 17 is upset by a riveting step so as to bend a portion thereof as indicated at 19, against the outer face of the collar and further to bind against the flange 15 whereby the cup 8 is fixedly secured in position. The bent portion 19 of the collar 17 engages throughout the flange 15 and tightly clamps said flange 15 against the body portion or mask 1.

The cup 8, is formed at its outer side with a series of air inlets 20.

It is thought the many advantages of a pair of goggles constructed in accordance with this invention can be readily understood, and although the preferred embodiment of the invention is as illustrated and described, yet it is to be understood that changes in the details of construction can be had which will fall within the scope of the invention as claimed.

What I claim is:—

1. In a pair of goggles, a mask provided with a pair of eye openings, an eye cup formed at its inner end with an inwardly extending flange adapted to be positioned against the outer face of the mask and to surround an eye opening, and a flanged collar having its flange abutting against the inner face of the mask, said collar extending through the eye opening in the mask and having its outer edge extended rearwardly and binding directly against said flange to fixedly secure the eye cup to the mask.

2. In a pair of goggles, a mask provided with a pair of eye openings, an eye cup formed at its inner end with an inwardly extending flange adapted to be positioned against the outer face of the mask and to surround an eye opening, said flange having its edge coextensive with the wall of the eye opening in the mask of the goggles, and a flanged collar having its flange abutting the inner face of said mask, said collar extending through the eye opening in the mask of the goggles and abutting against the wall of the latter and the edge of the flange of the eye cup and further having its outer end extended rearwardly and binding against the forward face of the flange of the eye cup to fixedly secure the latter to the mask.

3. In a pair of goggles, a mask provided with an eye opening, an eye cup having inherent means at its outer end for connecting a glass or lens therewith, said eye cup provided at its inner end with an inwardly extending flange abutting against the outer face of the mask and surrounding said opening, and means abutting the inner face of the mask, extending through said opening and abutting directly against the outer face of the flange for fixedly securing the eye cup to the mask.

In testimony whereof, I affix my signature hereto.

ROBERT MALCOM.